(12) United States Patent
Zhang et al.

(10) Patent No.: US 12,722,986 B2
(45) Date of Patent: Sep. 1, 2026

(54) INTEGRATED HEAT EXCHANGER AND SOUR WATER STRIPPER

(71) Applicant: Air Products and Chemicals, Inc., Allentown, PA (US)

(72) Inventors: Yanlai Zhang, Shanghai (CN); Xukun Luo, Allentown, PA (US)

(73) Assignee: AIR PRODUCUTS AND CHEMICALS, INC., Allentown, PA (US)

(*) Notice: Subject to any disclaimer, the term of this patent is extended or adjusted under 35 U.S.C. 154(b) by 368 days.

(21) Appl. No.: 18/491,136

(22) Filed: Oct. 20, 2023

(65) Prior Publication Data

US 2024/0067537 A1 Feb. 29, 2024

Related U.S. Application Data

(62) Division of application No. 17/462,080, filed on Aug. 31, 2021, now Pat. No. 11,827,535.

(51) Int. Cl.

| | |
|---|---|
| ***B01D 19/00*** | (2006.01) |
| ***B01D 5/00*** | (2006.01) |
| ***C02F 1/04*** | (2023.01) |
| ***C02F 1/16*** | (2023.01) |
| ***C02F 101/10*** | (2006.01) |
| ***C02F 101/16*** | (2006.01) |
| *C02F 101/30* | (2006.01) |
| *C02F 103/36* | (2006.01) |

(52) U.S. Cl.

CPC ................ *C02F 1/16* (2013.01); *B01D 5/006* (2013.01); *B01D 19/001* (2013.01); *C02F 1/04* (2013.01); *C02F 2101/101* (2013.01); *C02F 2101/16* (2013.01); *C02F 2101/30* (2013.01); *C02F 2103/365* (2013.01)

(58) Field of Classification Search

CPC .......... B01D 3/06; B01D 3/32; B01D 19/001; B01D 19/0036

See application file for complete search history.

(56) References Cited

U.S. PATENT DOCUMENTS

| | | | |
|---|---|---|---|
| 4,029,744 | A | 6/1977 | Li et al. |
| 2012/0079852 | A1 | 4/2012 | Northrop et al. |
| 2013/0183204 | A1 | 7/2013 | Benipal et al. |

(Continued)

FOREIGN PATENT DOCUMENTS

| | | | |
|---|---|---|---|
| CA | 2786574 | C | 7/2011 |
| CN | 1321729 | A | 11/2001 |
| CN | 2474538 | | 1/2002 |

(Continued)

OTHER PUBLICATIONS

Wang, Yun-gang et al., Applications of Alkaline Deamination Technique in Unit for Steam Stripping of Grey Water from Coal Gasification, Coal Chemical Industry. vol. 43, No. 1 (Feb. 28, 2015), pp. 43-45, 56. Translation.

*Primary Examiner* — Bradley R Spies

(74) *Attorney, Agent, or Firm* — Amy Carr Trexler; Jason M. Ploeger

(57) ABSTRACT

A combined vessel comprises a stripping section for removing acid gases from a sour water stream and a direct contact heat exchanger section for heating a graywater stream in order to improve heat and mass transfer in the treatment and recycle of water streams for a gasification process.

3 Claims, 4 Drawing Sheets

(56) References Cited

U.S. PATENT DOCUMENTS

2018/0305273 A1 * 10/2018 Patel ........................ C07C 2/84

FOREIGN PATENT DOCUMENTS

| | | | |
|---|---|---|---|
| CN | 102241419 | | 11/2011 |
| CN | 102336496 | A | 2/2012 |
| CN | 106044918 | | 10/2013 |
| CN | 103695041 | | 4/2014 |
| CN | 105366751 | | 3/2016 |
| CN | 205948388 | | 2/2017 |
| CN | 106587233 | | 4/2017 |
| CN | 106621415 | A | 5/2017 |
| CN | 106946394 | | 7/2017 |
| CN | 112107875 | | 12/2020 |
| DE | 3419514 | A1 | 3/1985 |
| WO | 2015134774 | A1 | 9/2015 |
| WO | 2016012251 | A1 | 1/2016 |

* cited by examiner

INTEGRATED HEAT EXCHANGER AND SOUR WATER STRIPPER

CROSS REFERENCE TO RELATED APPLICATIONS

This application is a divisional of, and claims the priority of, U.S. patent application Ser. No. 17/462,080 filed Aug. 31, 2021, which is incorporated by reference herein in its entirety.

BACKGROUND

The following invention is directed to a process for downstream treatment of water and/or condensate streams from a partial combustion or gasification process. The upstream gasification process may be any process that produces a sour water stream, typically a condensate stream, and a graywater stream, typically from an aerator. The most common gasification processes that do both are slurry feed gasifiers that feed an aqueous slurry of solid carbonaceous fuel and bottom quench gasifiers that quench the hot syngas product with water.

The term "solid carbonaceous fuel" as used herein is intended to include various gas-carried combustible materials and mixtures thereof, and may be selected from the group of coal, coke from coal, coal liquefaction residues, petroleum coke, soot, biomass, and particulate solids derived from oil shale, tar sands and pitch. The coal may be of any type, including lignite, sub-bituminous, bituminous and anthracite. The solid carbonaceous fuel may be delivered to the burner as a suspension in a fluid such as a carrier gas, also known as dry feed, or a liquid slurry.

The partial combustion or gasification of solid carbonaceous fuels such as coal to produce gases having value as residential and industrial fuels, as starting materials for synthesis of chemicals and fuels, and as an energy source for generation of electricity has long been recognized and practiced on varying scales throughout the world.

A sour water stripper is required when impurities such as hydrogen sulfide, carbon dioxide, and ammonia accumulate in a liquid stream, typically a condensate stream. In order to recycle the sour water, one or more of the impurities must be removed in a sour water stripper. Of these impurities, ammonia is typically the most difficult to remove. Graywater refers to low solids-content water streams from an aerator, settling tank, or other chemical treatment, and has a fine solids concentration typically less than 100 mg/m3. This is in contrast with blackwater streams from the gasifier quench, or from any system to remove ash, slag, and/or soot from the syngas, which typically has a fine solids concentration much higher than 1 g/m3. The overall efficiency of the gasification process is improved when graywater is heated before being recycled, which may be accomplished through indirect heat exchange with a process stream and/or steam or by direct heat exchange, for example with a high-pressure vapor stream.

Bao et al. (CN 205948388U) teach an integrated high-pressure flash and direct contact heat exchanger in the treatment systems for blackwater and graywater on the gasification island. The blackwater enters the high-pressure flash section, and the vapor travels up through the direct contact heat exchanger section heating the graywater traveling down.

Wang et al. (CN 106587233A) teach a water and/or condensate treatment system that has separate vessels for the sour water stripper and the direct contact heat exchanger.

Blackwater is flashed at high pressure, and the high-pressure vapor heats a graywater stream in a direct contact heat exchanger. The high-pressure vapor is then washed by clean water, further cooled in one or more heat exchangers, then used as a stripping gas in a sour water stripper that uses steam as a heat source.

Historically the sour water stripper and the graywater heater are on different blocks, or islands, of a gasification plant that may be designed by different licensors and operated by different operators. The independent design and operation of the two islands have resulted in a lack of consideration for integrating the sour water stripper and graywater heater. There exists a need for a streamlined water and/or condensate treatment system to reduce costs, save energy, and improve reliability.

SUMMARY

The invention relates to the integration of a sour water stripper and a direct contact heat exchanger into a combined vessel. The stripping section at the top of the vessel may use different internals than the direct contact heat exchanger section below. The condensate stream enters at the top of the vessel. The graywater stream may enter at the top of the vessel or above the direct contact heat exchanger section. Vapor from a high-pressure black water flash enters the bottom of the direct contact heat exchanger section to heat the graywater stream and to provide a stripping gas for the stripping section. In some embodiments the high-pressure flash may be integrated into the single vessel. A vapor stream leaves the top of the stripping section and may be condensed with an internal or external condenser. A treated water stream leaves the bottom of the direct contact heat exchanger section and may be recycled to the gasifier.

Aspect 1: An apparatus for improving mass and heat transfer between multiple streams, the apparatus comprising a combined vessel comprising a stripping section and a direct contact heat exchanger section; wherein the stripping section is configured to contact a first sour water stream with a stripping gas stream to produce an acid gas-enriched overhead stream and an acid gas-depleted bottoms stream; and wherein the heat exchange section is configured to contact a high-pressure vapor stream with a graywater stream and the acid gas-depleted bottoms stream to produce the stripping gas stream and a treated graywater stream.

Aspect 2: An apparatus according to Aspect 1, wherein the combined vessel further comprises a flash section; wherein the flash section is configured to separate a blackwater stream to produce the high-pressure vapor stream and a blackwater bottoms stream.

Aspect 3: An apparatus according to Aspect 1 or Aspect 2, further comprising a condenser configured to partially condense the acid gas-enriched overhead stream by indirect heat exchange to a second sour water stream to produce a partially condensed overhead stream and the first sour water stream; and a condenser separator configured to separate the partially condensed overhead stream to produce a sour gas stream and an overhead condensate stream.

Aspect 4: An apparatus according to Aspect 3, wherein the combined vessel comprises the condenser and condenser separator.

Aspect 5: An apparatus for improving mass and heat transfer between multiple streams, the apparatus comprising a combined vessel comprising a stripping section, a direct contact heat exchanger section, and a vertical dividing wall; wherein the stripping section is configured to contact a sour water stream with a stripping gas stream to produce a first acid gas-enriched overhead stream and an acid gas-depleted bottoms stream; wherein the heat exchange section is configured to contact a high-pressure vapor stream with a graywater stream to produce a second acid gas-enriched overhead stream and a treated graywater stream; and wherein the stripping section and the heat exchange section are separated by the dividing wall.

Aspect 6: A process for improving mass and heat transfer between multiple streams, the process comprising contacting a first sour water stream with a stripping gas stream to produce an acid gas-enriched overhead stream and an acid gas-depleted bottoms stream; and contacting a high-pressure vapor stream with a graywater stream and the acid gas-depleted bottoms stream to produce the stripping gas stream and a treated graywater stream; wherein the stripping gas stream is not cooled prior to contacting the first sour water stream.

Aspect 7: A process according to Aspect 6, further comprising separating a blackwater stream to produce the high-pressure vapor stream and a blackwater bottoms stream; wherein contacting the first sour water stream with the stripping gas stream to produce the acid gas-enriched overhead stream and the acid gas-depleted bottoms stream, contacting the high-pressure vapor stream with the graywater stream and the acid gas-depleted bottoms stream to produce the stripping gas stream and the treated graywater stream, and separating the blackwater stream to produce the high-pressure vapor stream and the blackwater bottoms stream, all take place within a combined vessel.

Aspect 8: A process according to Aspect 6 or Aspect 7, further comprising condensing the acid gas-enriched overhead stream by indirect heat exchange with a second sour water stream to produce a partially condensed overhead stream and the first sour water stream; and separating the partially condensed overhead stream to produce a sour gas stream and an overhead condensate stream.

Aspect 9: A process according to Aspect 8, wherein the acid gas-enriched overhead stream is condensed in the combined vessel; and wherein the partially condensed overhead stream is separated in the combined vessel.

Aspect 10: A process according to any of Aspects 6 to 9, wherein the temperature of the treated graywater stream is between 0.1 and 10° C. below the saturation temperature.

Aspect 11: A process for improving mass and heat transfer between multiple streams, the process comprising contacting a first sour water stream with a first stripping gas stream to produce a first acid gas-enriched overhead stream and a first acid gas-depleted bottoms stream; and contacting a graywater stream with a second stripping gas stream to produce a second acid gas-enriched overhead stream and a second acid gas-depleted bottoms stream; wherein contacting the first sour water stream with the first stripping gas stream to produce the first acid gas-enriched overhead stream and the first acid gas-depleted bottoms stream, and contacting the graywater stream with the second stripping gas stream to produce the second acid gas-enriched overhead stream and the second acid gas-depleted bottoms stream take place within a combined vessel.

Aspect 12: A process according to Aspect 11, further comprising separating a blackwater stream to produce a high-pressure vapor stream and a blackwater bottoms stream; wherein the second stripping gas comprises at least a portion of the high-pressure vapor stream.

Aspect 13: A process according to Aspect 12, wherein the first stripping gas comprises at least a portion of the high-pressure vapor stream.

Aspect 14: A process according to any of Aspects 11 to 13, wherein the first stripping gas comprises steam.

Aspect 15: A process according to any of Aspects 11 to 14, wherein the solids content of the first acid gas-depleted bottoms stream is lower than the solids content of the second acid gas-depleted bottoms stream on a mass basis.

BRIEF DESCRIPTION OF THE DRAWINGS

The present invention will hereinafter be described in conjunction with the appended figures wherein like numerals denote like elements.

DETAILED DESCRIPTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The articles "a" or "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "and/or" placed between a first entity and a second entity includes any of the meanings of (1) only the first entity, (2) only the second entity, or (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B but not C, (5) A and C but not B, (6) B and C but not A, and (7) A and B and C.

The term "plurality" means "two or more than two."

The adjective "any" means one, some, or all, indiscriminately of quantity.

The phrase "at least a portion" means "a portion or all." The "at least a portion of a stream" has the same composition, with the same concentration of each of the species, as the stream from which it is derived.

As used herein, "first," "second," "third," etc. are used to distinguish among a plurality of steps and/or features, and is not indicative of the total number, or relative position in time and/or space, unless expressly stated as such.

The terms “depleted” or “lean” mean having a lesser mole percent concentration of the indicated component than the original stream from which it was formed. “Depleted” and “lean” do not mean that the stream is completely lacking the indicated component.

The terms “rich” or “enriched” mean having a greater mole percent concentration of the indicated component than the original stream from which it was formed.

Figure 1:
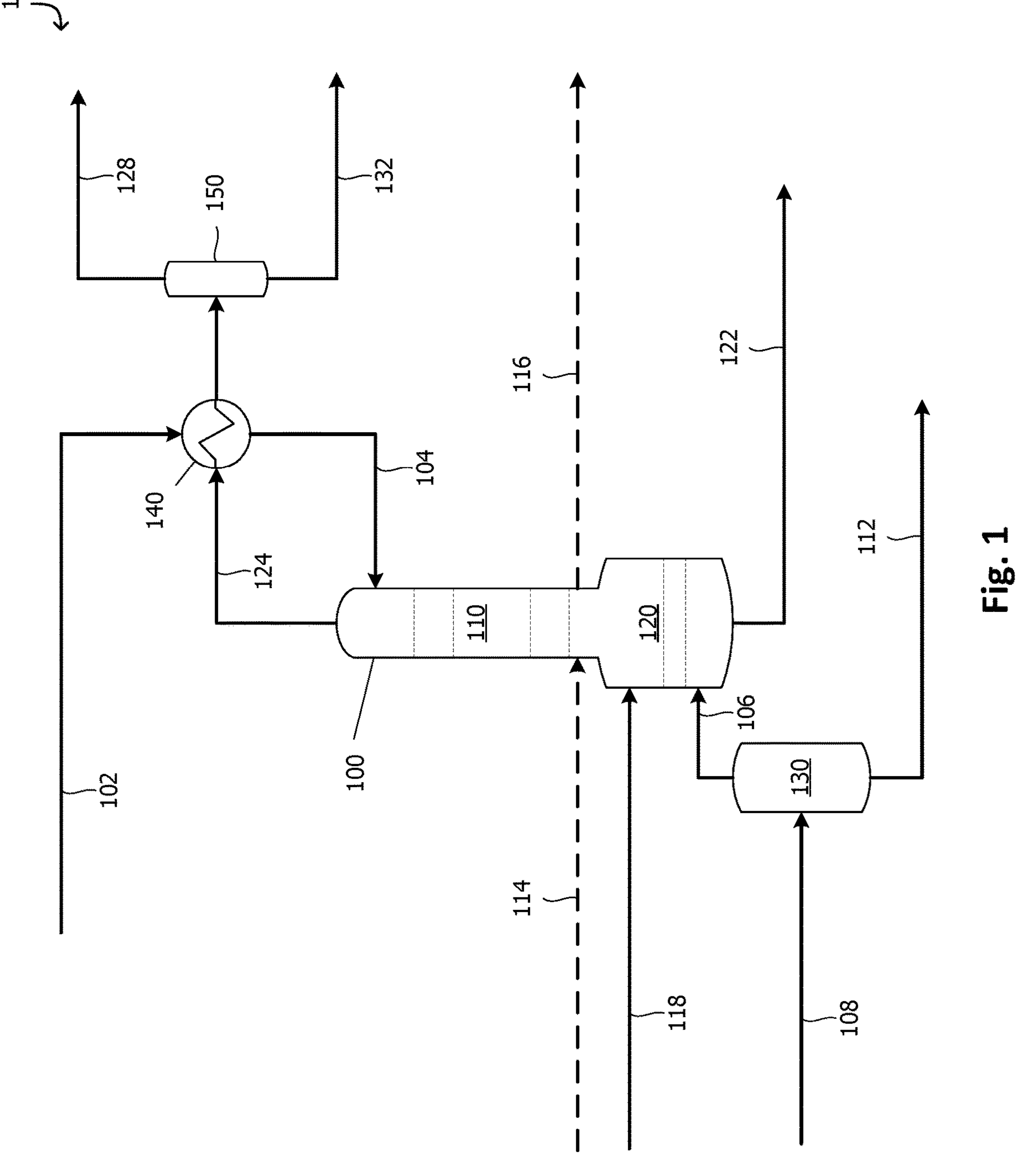
FIG. 1 is a flowsheet depicting the combined sour water stripper and direct contact heat exchanger according to the present invention.

FIG. 1 shows a process 1 for the treatment of water and/or condensate from a gasification process. A sour water stream 102 comprising one or more impurities selected from the group consisting of hydrogen sulfide, carbon dioxide, and ammonia may be heated in condenser 140 before entering a combined vessel 100 as sour water stream 104. Alternatively, the sour water stream 102 may enter the top of the combined vessel 100 directly and the cooling duty for condenser 140 can be delivered from a heat transfer medium such as cooling water. The sour water stream 102 may be formed from condensate leaving the sour shift block and/or from liquid discharge from the ammonia scrubber. The sour shift block is where CO is converted to H2 using the water gas shift reaction in the presence of sulfur compounds like H2S, so condensate leaving the sour shift block will contain H2S. The ammonia scrubber washes ammonia out of the syngas using water, resulting in an aqueous stream comprising ammonia and acid gases such as H2S and CO2.

The combined vessel 100 comprises a stripping section 110 located above a direct contact heat exchanger section 120. Both the stripping section 110 and the direct contact heat exchanger section 120 may comprise column internals such as packing and/or trays to improve mass and heat transfer respectively. Due to the different flow rates of liquid in the two sections, the column diameters may be different, typically with a larger diameter in the direct contact heat exchanger section 120. The direct contact heat exchanger section reduces the risk of fouling and blockage compared to an indirect heat exchanger.

The solids content of graywater stream 118 places a constraint on the tray design of the direct contact heat exchanger section 120. Because the only liquid the trays in the stripping section 110 are exposed to is the solids-free sour water stream 104, the stripping section may comprise any column internals that promote gas-liquid contact such as floating valve trays, fixed valve trays, random packing, or structured packing. However, the solids in the graywater stream 118 present a fouling risk to the direct contact heat exchanger section 120, requiring column internals that can handle liquids with suspended solids, such as fixed valve trays, rectangular valve trays, grid trays, and dual flow trays.

Sour gases from the sour water stream 104 are stripped by high-pressure vapor stream 106 which enters the combined vessel near the bottom in the direct contact heat exchanger section 120 and travels up through the combined vessel 100 into the stripping section 110. An acid gas-depleted bottoms stream exits the stripping section 110 and enters the direct contact heat exchanger section 120. The high-pressure vapor stream 106 is produced by separating a blackwater stream 108 from the gasifier process in a high-pressure separator 130, also producing a high-pressure liquid stream 112 which is in turn sent to further treatment to further separate solids from liquids, such as one or more stages of flash separation at low pressure and/or vacuum, and/or settling tanks (not shown). The high-pressure separator 130 may be any vapor-liquid separator including a flash vessel or a plurality of stages of separation in a column. The blackwater stream 108 refers to any high-solids content water stream (higher than 1 g/m3) that may be produced by the gasification process, for example a quench process or other system to remove solids such as ash, slag, and/or soot from the syngas. If additional heat input is needed to remove sour gases from the sour water stream 104, then steam 114 may provide that heat by indirect heat exchange. Steam 114 may also be mixed with high-pressure vapor stream 106 prior to entering the combined vessel 100. The resulting condensate stream 116 may be sent to the wet scrubber.

A graywater stream 118 may be fed to the combined vessel 100 in the direct contact heat exchanger section 120, the stripping section 110, or mixed with the sour water stream 102. The graywater stream 118 refers to any low solids content water stream that may be produced by the gasification process, for example the aerator. The decision on where to feed the graywater stream 118 may be made based on the composition of the graywater stream 118 and the sour water stream 102. For example, if the ammonia content of the sour water stream 102 is low then there is less risk of fouling from mixing the sour water stream 102 with the graywater stream 118, and the two may be mixed and fed to the stripping section 110. In the embodiment shown in FIG. 1, the graywater stream 118 enters in the direct contact heat exchanger section 120, where it is heated by direct heat exchange against the high-pressure vapor stream 106. The vapor stream leaving the top of the direct contact heat exchanger section 120 enters the stripping section 110 without any heat exchange or other changes in pressure or composition, where it acts as a stripping gas to remove impurities from sour water stream 104. Using the high-quality heat from the high-pressure vapor stream 106 to strip the sour water stream 104 allows removal of ammonia with less, or potentially zero, demand for steam 114. Compared with the prior art in which ammonia is typically removed in a dedicated vessel with steam heating, the present invention eliminates that dedicated vessel and performs the function in the combined vessel.

A treated graywater stream 122 that has been heated to a temperature between 0.1 and 10° C., or between 1 and 5° C., below the saturation temperature leaves the bottom of the combined vessel 100. Since the typical pressure range of the treated graywater stream 122 is between 5 and 11 bara, the temperature of the treated graywater stream 122 will typically be between 150 and 185° C. The sulfur content of the treated graywater stream will typically be less than 100 ppm by weight. The treated graywater stream 122 can then be recycled to supply process water where needed in the gasification process, for example the wet scrubber and/or quench vessels (not shown). Maximizing the temperature of the treated graywater stream 122 for use in the wet scrubber improves the overall heat recovery of the gasification process by increasing the syngas temperature leaving the wet scrubber, resulting in a greater quantity and quality of heat recovered in the sour shift block. The single treated graywater stream that must be recycled compared to the separate treated graywater and treated sour water streams in the prior art would also eliminate redundant pumps.

An acid gas-enriched overhead stream 124 comprising the stripped sour gases leaves the top of the combined vessel 100 and is partially condensed in condenser 140 against the sour water stream 102. The resulting partially condensed overhead stream 126 is separated in condenser separator 150 into a sour gas stream 128, which can be sent to a sulfur recovery unit, and an overhead condensate stream 132 that can be recycled to supply process water where needed in the gasification process, for example the wet scrubber and/or quench vessels. Overhead condensate stream 132 may also be returned to the stripping section 110. Cooling water may be used to partially condense the acid gas-enriched overhead stream 124 in addition to, or replacing, the cooling duty from the sour water stream 102.

Figure 2:
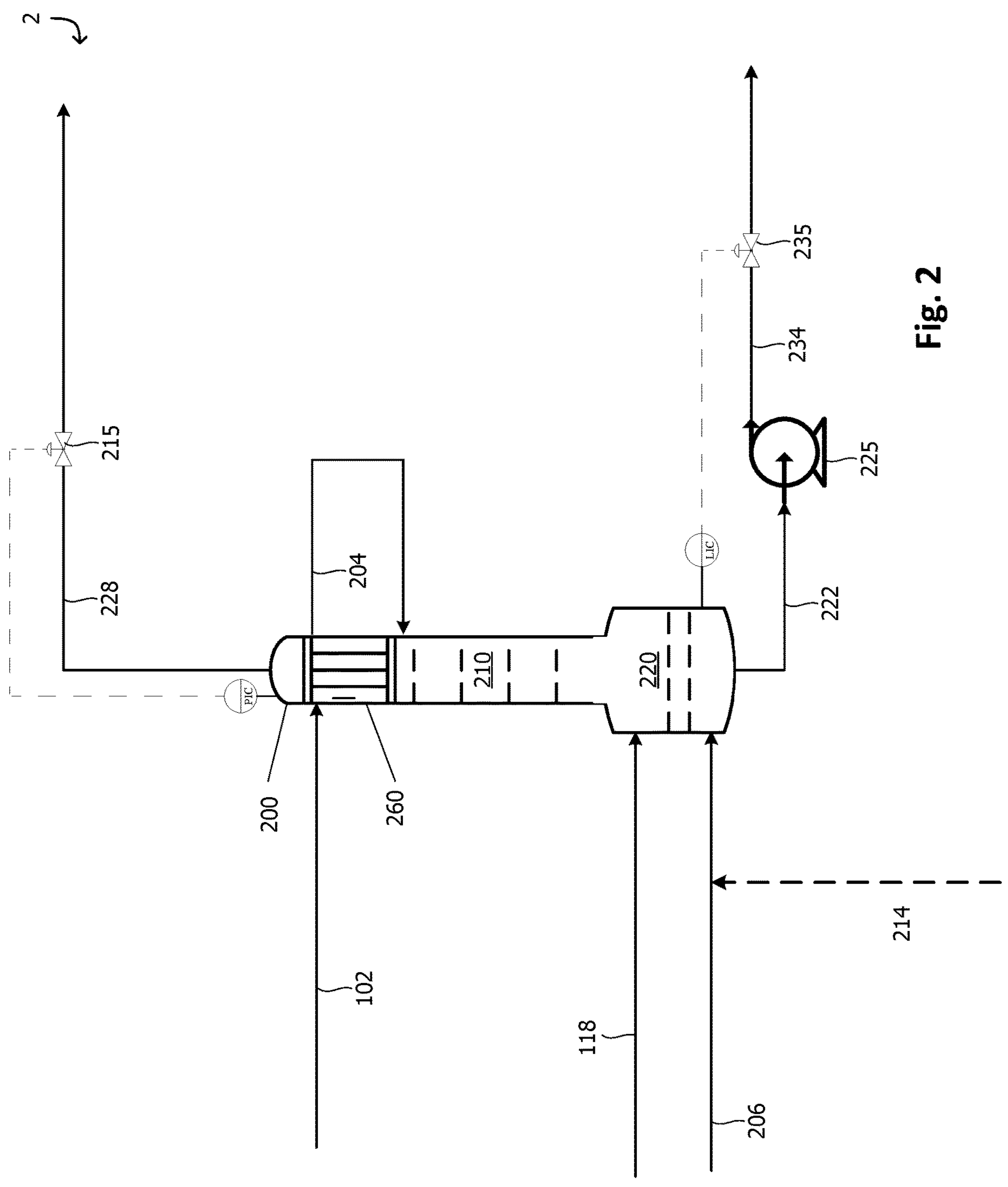
FIG. 2 is a flowsheet depicting a modification of the embodiment in FIG. 1 in which the overhead condenser is integrated with the combined vessel.

FIG. 2 shows an embodiment of a process 2 for the treatment of water and/or condensate from a gasification process that integrates the condenser and condenser separator into the combined vessel, and also shows some control features. In contrast with FIG. 1, with condenser 140 and condenser separator 150 that are separate from the combined vessel 100, in FIG. 2 a combined vessel 200 comprises a condenser 260 that performs both functions of indirect heat exchange and vapor-liquid separation. The combined vessel 200 also comprises a stripping section 210 below the condenser 260 and a direct contact heat exchanger section 220 below the stripping section 210. As in FIG. 1, both the stripping section 210 and the direct contact heat exchanger section 220 may comprise packing and/or trays to improve mass and heat transfer respectively. Trays such as fixed valve trays may be employed when one or more feed streams to the combined vessel comprise a high solids content.

Sour water stream 102 comprising sulfur-containing gases such as hydrogen sulfide is heated in the condenser 260 before entering the combined vessel 200 as sour water stream 204. As in FIG. 1, a heat transfer medium such as cooling water may provide the cooling duty for the condenser 260 and the sour water stream 102 may enter the combined vessel 200 directly. The sour water stream 102 may be formed from condensate leaving the shift block of the gasification process. The sour water stream 204 enters the combined vessel 200 above the stripping section 210

Sour gases from the sour water stream 204 are stripped by high-pressure vapor stream 206 which enters the combined vessel near the bottom in the direct contact heat exchanger section 220 and travels up through the combined vessel 200 into the stripping section 210. Steam 214 may be mixed with the high-pressure vapor stream 206 prior to entering the heat exchanger section 220, and may also be added directly to the heat exchanger section 220. An acid gas-depleted bottoms stream exits the stripping section 210 and enters the direct contact heat exchanger section 220.

Graywater stream 118 may be fed to the combined vessel 200 in the direct contact heat exchanger section 220, the stripping section 210, or mixed with the sour water stream 102. In the embodiment shown in FIG. 2, the graywater stream 118 enters in the direct contact heat exchanger section 220, where it is heated by direct heat exchange against the high-pressure vapor stream 206. The graywater stream 118 refers to any low solids content water stream that may be produced by the gasification process, for example the aerator.

A treated graywater stream 222 that has been heated to a temperature between 0.1 and 10° C., or between 1 and 5° C., below the saturation temperature leaves the bottom of the combined vessel 200. Since the typical pressure range of the treated graywater stream 222 is between 5 and 11 bara, the temperature of the treated graywater stream 222 will typically be between 150 and 185° C. The sulfur content of the treated graywater stream will typically be less than 100 ppm by weight. The treated graywater stream 222 may optionally be pumped in pump 225 to be recycled as pumped treated graywater stream 234, or may be recycled as treated graywater stream 222 if higher pressures are not required. A level controller LIC is shown in connection with a control valve 235 to maintain the liquid level in the bottom of the direct contact heat exchanger section 220 at a constant height.

An acid gas-enriched overhead stream leaves the top of the stripping section 210 and is partially condensed and separated in condenser 260 against the sour water stream 102, producing a sour gas stream 228, which can be sent to a sulfur recovery unit, and an overhead condensate stream that reenters the stripping section 210. A pressure controller PIC at the top of the combined vessel 200 controls a valve 215 to maintain the pressure of the combined vessel at a constant.

Figure 3:
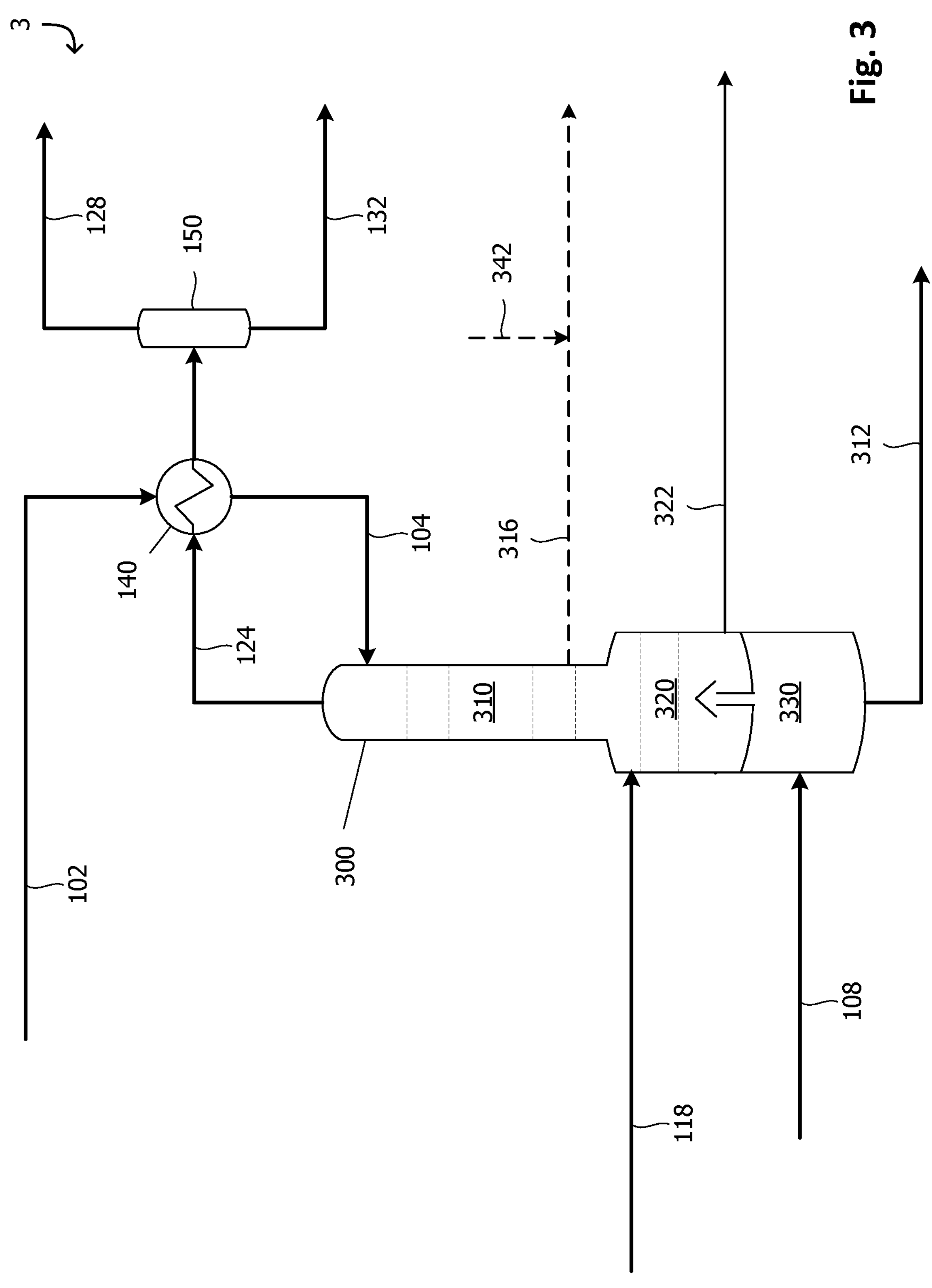
FIG. 3 is a flowsheet depicting a modification of the embodiment in FIG. 1 in which the high-pressure separator is integrated with the combined vessel.

The combined vessel may further comprise a high-pressure separator, as shown in FIG. 3. Here process 3 is generally similar to process 1. A combined vessel 300 comprises a stripping section 310 that accepts the sour water stream 104, a direct contact heat exchanger section that accepts the graywater stream 118, and a high-pressure separator section 330 that accepts the blackwater stream 108. A high-pressure vapor stream exits from the high-pressure separator section 330 into the direct contact heat exchanger system to be contacted with the graywater stream 118 and the sour water stream 104.

The acid gas-enriched overhead stream 124 exits the top of the combined vessel and is partially condensed as described in FIG. 1. A high-pressure liquid stream 312 exits the bottom of the high-pressure separator section 330 as in FIG. 1 and is then sent to further treatment to further separate solids from liquids, such as one or more stages of flash separation at low pressure and/or vacuum, and/or settling tanks. A treated graywater stream 322 exits the bottom of the direct contact heat exchanger section 320, having been heated to a temperature between 0.1 and 10° C., or between 1 and 5° C., below the saturation temperature. FIG. 3 shows an optional side draw exiting the combined vessel 300 in which a condensate stream 316 is withdrawn and used as a low-solids process water stream to quench hot streams, scrub impurities and/or solids from gas streams, and/or flush equipment. The condensate stream 316 may be augmented by adding shift condensate 342 from syngas cooling at a higher temperature and is expected to contain lower concentrations of impurities.

Figure 4:
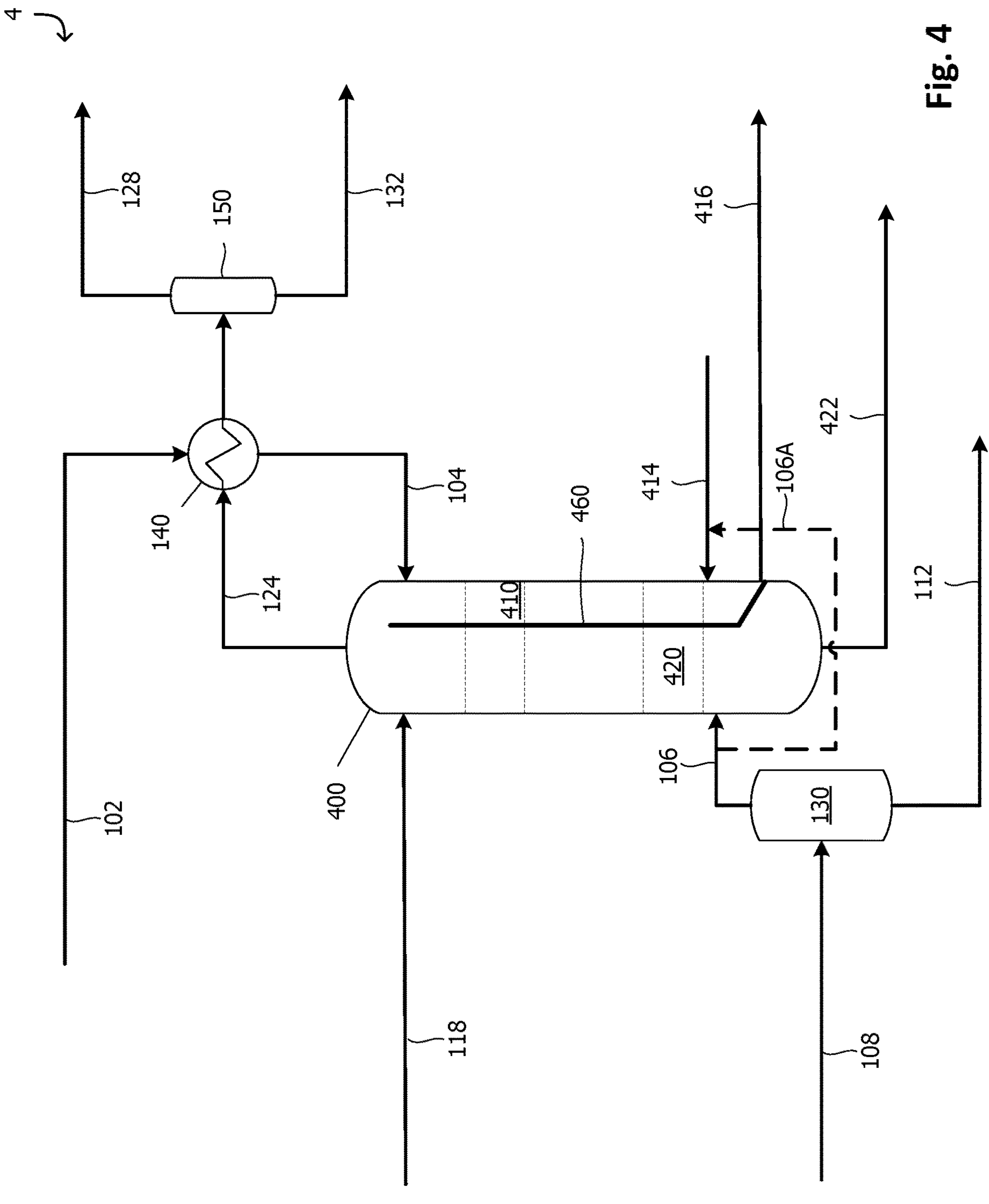
FIG. 4 is a flowsheet depicting a modification of the embodiment in FIG. 1 in which the combined vessel is a divided wall column.

Instead of segmenting the combined vessel into vertically stacked sections, it may also be accomplished using a divided wall column as shown in FIG. 4 in which a process 4 uses a combined vessel 400 that is divided into a stripping section 410 and a direct contact heat exchanger section 420 by a dividing wall 460. The sour water stream 104 enters the top of the stripping section 410 and is contacted with steam 414 and/or a portion of high-pressure vapor stream 106A entering near the bottom of the stripping section 410. A treated condensate stream 416 exits the bottom of the stripping section 410 and may be used as a low-solids process water stream to quench hot streams, scrub impurities and/or solids from gas streams, and/or flush equipment. The graywater stream 118 enters the direct contact heat exchanger section 420 and is contacted with high-pressure vapor stream 106. A treated graywater stream 422 exits the bottom of the direct contact heat exchanger section 420 and may be used in the wet scrubber. The high-pressure vapor stream 106 and the steam 414 are mixed in the top of the combined vessel and exit the top as the acid gas-enriched overhead stream 124. This arrangement allows impurities to be removed from sour water stream 104 without adding solids from the graywater stream 118, and provides two process water streams: the treated graywater stream 422 with a low solids content on a mass basis, and the treated condensate stream 416 with essentially zero solids content on a mass basis. The horizontal integration of the two sections saves height compared to the vertical integration of FIG. 1.

Example

A computer simulation of a dry feed gasification process consuming 3000 tonnes per day of coal was carried out in Aspen Plus, a commercial process simulation software package available from Aspen Technology, Inc. The low-pressure steam consumption rate for recycling blackwater, graywater, and sour water was compared for a system using the combined vessel of FIG. 1 to a system using separate vessels for sour water stripping and graywater heating. The combined vessel reduced low-pressure steam consumption by 400 tonnes per day compared to a baseline consumption rate of 3000 tonnes per day for separate vessels. This is a significant savings in utility consumption in addition to the elimination of redundant equipment such as pumps for having two separate recycled water systems.

Similar steam savings were found for other conditions, for example in a slurry feed case the baseline low-pressure steam consumption rate of 3000 tonnes per day was reduced by 300 tonnes per day for the combined vessel case.

While the principles of the invention have been described above in connection with preferred embodiments, it is to be clearly understood that this description is made only by way of example and not as a limitation of the scope of the invention.

The invention claimed is:

1. An apparatus for improving mass and heat transfer between multiple streams, the apparatus comprising:

a combined vessel comprising a stripping section, a direct contact heat exchanger section, and a flash section;

wherein the stripping section is configured to contact a first sour water stream with a stripping gas stream to produce an acid gas-enriched overhead stream and an acid gas-depleted bottoms stream;

wherein the heat exchange section comprises packing and/or trays and is configured to contact a high-pressure vapor stream with a graywater stream and the acid gas-depleted bottoms stream to produce the stripping gas stream and a treated graywater stream; and wherein the flash section is configured to separate a blackwater stream to produce the high-pressure vapor stream and a blackwater bottoms stream.

2. The apparatus of claim 1, further comprising:

a condenser configured to partially condense the acid gas-enriched overhead stream by indirect heat exchange to a second sour water stream to produce a partially condensed overhead stream and the first sour water stream; and a condenser separator configured to separate the partially condensed overhead stream to produce a sour gas stream and an overhead condensate stream.

3. The apparatus of claim 2, wherein the combined vessel comprises the condenser and condenser separator.

* * * * *